(12) United States Patent
Ekberg et al.

(10) Patent No.: US 7,590,097 B2
(45) Date of Patent: Sep. 15, 2009

(54) DEVICE DETECTION AND SERVICE DISCOVERY SYSTEM AND METHOD FOR A MOBILE AD HOC COMMUNICATIONS NETWORK

(75) Inventors: Jan-Erik Ekberg, Helsinki (FI); Pekka Lahtinen, Helsinki (FI); Jaakko Lipasti, Jorvas (FI)

(73) Assignee: Nokia Corporation, Espoo (FI)

( * ) Notice: Subject to any disclaimer, the term of this patent is extended or adjusted under 35 U.S.C. 154(b) by 616 days.

(21) Appl. No.: 10/662,407

(22) Filed: Sep. 16, 2003

(65) Prior Publication Data

US 2004/0087274 A1 May 6, 2004

Related U.S. Application Data

(63) Continuation-in-part of application No. 10/284,135, filed on Oct. 31, 2002, now Pat. No. 6,909,721.

(51) Int. Cl.
*H04W 4/00* (2009.01)
*H04B 7/00* (2006.01)
*G06F 15/16* (2006.01)

(52) U.S. Cl. .......... 370/338; 455/41.2; 709/227
(58) Field of Classification Search .......... 707/1; 340/825.38; 709/228; 370/338
See application file for complete search history.

(56) References Cited

U.S. PATENT DOCUMENTS

| | | | |
|---|---|---|---|
| 5,521,251 A | 5/1996 | Satoh et al. | |
| 5,819,039 A | 10/1998 | Morgaine | |
| 6,112,103 A | 8/2000 | Puthuff | |
| 6,198,941 B1 | 3/2001 | Aho et al. | |
| 6,219,696 B1 | 4/2001 | Wynblatt et al. | |
| 6,532,368 B1 | 3/2003 | Hild et al. | |
| 6,591,266 B1 | 7/2003 | Li et al. | |
| 6,601,093 B1 * | 7/2003 | Peters | 709/220 |
| 6,604,140 B1 * | 8/2003 | Beck et al. | 709/226 |
| 6,614,899 B1 | 9/2003 | Sollee et al. | |
| 6,631,269 B1 | 10/2003 | Cave | |

(Continued)

FOREIGN PATENT DOCUMENTS

DE    10112409 (A1)    9/2002

(Continued)

OTHER PUBLICATIONS

U.S. Appl. No. 10/248,135, filed Oct. 31, 2002, Ekberg et al.

(Continued)

*Primary Examiner*—Charles N Appiah
*Assistant Examiner*—Huy C Ho
(74) *Attorney, Agent, or Firm*—Locke Lord Bissell & Liddell

(57) ABSTRACT

A computer system, method, and computer program product for performing device detection and service discovery in a mobile ad hoc communications network. The method comprises conducting an inquiry of the mobile ad hoc communications network to discover nearby devices. If the inquiry indicates that the nearby devices may include a middleware layer, the method further comprises creating a connection to each of the nearby devices and confirming whether each of the nearby devices include the middleware layer. For each of the nearby devices that include the middleware layer, the method further comprises executing the middleware layer to perform application and service discovery, and to launch applications and services.

53 Claims, 8 Drawing Sheets

U.S. PATENT DOCUMENTS

| | | | |
|---|---|---|---|
| 6,633,757 | B1 | 10/2003 | Hermann et al. |
| 6,657,713 | B2 | 12/2003 | Hansen |
| 6,757,715 | B1 | 6/2004 | Philyaw |
| 6,765,474 | B2 | 7/2004 | Eaton et al. |
| 6,909,721 | B2 | 6/2005 | Ekberg et al. |
| 6,981,210 | B2 | 12/2005 | Peters et al. |
| 7,028,032 | B1 | 4/2006 | Diedrich et al. |
| 7,158,176 | B2 | 1/2007 | Tokkonen et al. |
| 2002/0012329 | A1* | 1/2002 | Atkinson et al. ............ 370/330 |
| 2002/0039367 | A1 | 4/2002 | Seppala et al. |
| 2002/0044549 | A1 | 4/2002 | Johansson et al. |
| 2002/0073204 | A1 | 6/2002 | Dutta et al. |
| 2002/0120750 | A1 | 8/2002 | Nidd |
| 2002/0123360 | A1 | 9/2002 | Vikman et al. |
| 2002/0124046 | A1 | 9/2002 | Fischer et al. |
| 2002/0129170 | A1 | 9/2002 | Moore et al. |
| 2002/0152299 | A1* | 10/2002 | Traversat et al. ............ 709/223 |
| 2002/0160758 | A1 | 10/2002 | Pradhan et al. |
| 2002/0160793 | A1 | 10/2002 | Pradhan et al. |
| 2002/0178216 | A1 | 11/2002 | Walther et al. .............. 709/203 |
| 2002/0188657 | A1 | 12/2002 | Traversat et al. |
| 2003/0006911 | A1 | 1/2003 | Smith et al. |
| 2003/0013483 | A1 | 1/2003 | Ausems et al. |
| 2003/0037033 | A1* | 2/2003 | Nyman et al. .................. 707/1 |
| 2003/0041141 | A1* | 2/2003 | Abdelaziz et al. ........... 709/223 |
| 2003/0054806 | A1 | 3/2003 | Ho et al. |
| 2003/0061364 | A1 | 3/2003 | Banerjee et al. |
| 2003/0069016 | A1 | 4/2003 | Bahl et al. |
| 2003/0078062 | A1* | 4/2003 | Burr ........................... 455/502 |
| 2003/0110218 | A1 | 6/2003 | Stanley |
| 2003/0115415 | A1 | 6/2003 | Want et al. |
| 2003/0131059 | A1 | 7/2003 | Brown et al. |
| 2003/0207683 | A1 | 11/2003 | Lempio et al. |
| 2003/0208522 | A1* | 11/2003 | McDonnell et al. ......... 709/201 |
| 2003/0228842 | A1 | 12/2003 | Heinonen et al. |
| 2004/0002385 | A1 | 1/2004 | Nguyen |
| 2004/0009750 | A1* | 1/2004 | Beros et al. ................. 455/41.2 |
| 2004/0015403 | A1 | 1/2004 | Moskowitz et al. |
| 2004/0030743 | A1* | 2/2004 | Hugly et al. ................ 709/203 |
| 2004/0043770 | A1 | 3/2004 | Amit et al. |
| 2004/0063498 | A1 | 4/2004 | Oakes et al. |
| 2004/0063980 | A1 | 4/2004 | Raths et al. |
| 2004/0064568 | A1* | 4/2004 | Arora et al. ................. 709/228 |
| 2004/0075675 | A1 | 4/2004 | Raivisto et al. |
| 2004/0087274 | A1 | 5/2004 | Ekberg et al. |
| 2004/0114557 | A1 | 6/2004 | Bryan et al. |
| 2004/0171378 | A1 | 9/2004 | Rautila |
| 2004/0224706 | A1 | 11/2004 | Lorello et al. |
| 2004/0225712 | A1 | 11/2004 | Tajima et al. |
| 2005/0058108 | A1 | 3/2005 | Ekberg et al. |
| 2005/0058109 | A1 | 3/2005 | Ekberg et al. |
| 2005/0058149 | A1* | 3/2005 | Howe ........................ 370/428 |
| 2005/0059379 | A1 | 3/2005 | Sovio et al. |
| 2005/0088980 | A1* | 4/2005 | Olkkonen et al. ........... 370/255 |
| 2005/0114756 | A1 | 5/2005 | Lehikoinen et al. |
| 2005/0185660 | A1 | 8/2005 | Ekberg et al. |
| 2005/0208892 | A1 | 9/2005 | Kotola et al. |
| 2005/0239494 | A1 | 10/2005 | Klassen et al. |
| 2006/0058011 | A1 | 3/2006 | Vanska et al. |
| 2006/0199533 | A1 | 9/2006 | Zilliacus et al. |
| 2006/0258338 | A1 | 11/2006 | Markki et al. |
| 2006/0268896 | A1 | 11/2006 | Kotola et al. |

FOREIGN PATENT DOCUMENTS

| | | | |
|---|---|---|---|
| EP | 1246487 | A2 | 2/2002 |
| EP | 1207707 | A1 | 5/2002 |
| EP | 1242986 | B1 | 9/2002 |
| EP | 123540 | A2 | 10/2002 |
| EP | 1246487 | A3 | 10/2002 |
| EP | 1392023 | A2 | 2/2004 |
| EP | 1392023 | A3 | 2/2004 |
| EP | 1505811 | A1 | 2/2005 |
| GB | 2410153 | A | 7/2005 |
| JP | 2003/016347 | A1 | 1/2003 |
| WO | WO 99/41876 | | 8/1999 |
| WO | WO 00/72506 | A1 | 11/2000 |
| WO | WO 01/31960 | A1 | 5/2001 |
| WO | WO 01/45319 | | 6/2001 |
| WO | WO 01/95592 | A1 | 12/2001 |
| WO | WO 02/071285 | A1 | 9/2002 |
| WO | WO 03/034664 | | 4/2003 |
| WO | WO 03/055150 | A2 | 7/2003 |
| WO | WO 03/055238 | A1 | 7/2003 |
| WO | WO 2004/038541 | A2 | 5/2004 |
| WO | WO 2004/091143 | A2 | 10/2004 |
| WO | WO 2005/038696 | A1 | 4/2005 |
| WO | WO 2006/092688 | A2 | 9/2006 |

OTHER PUBLICATIONS

U.S. Appl. No. 10/662,470, filed Sep. 16, 2003, Ekberg.
U.S. Appl. No. 10/662,469, filed Sep. 16, 2003, Ekberg et al.
U.S. Appl. No. 10/784,215, filed Feb. 24, 2004, Sovio et al.
"Assigned Numbers", article [online], Bluetooth SIG, Inc., 1999-2001 [2 pages retrieved on Sep. 3, 2003]. Retrieved from the Internet: <http://www.bluetoothsig.org/assigned-numbers/>.
"Assigned Numbers—Bluetooth Baseband", article [online], Bluetooth SIG., Inc. 1999-2001 [7 pages retrieved on Sep. 3, 2003]. Retrieved from the Internet <http://www.bluetoothsig.org/assigned-numbers/baseband.html>.
"Assigned Numbers—Link Manager Protocol (LMP)", article [online], Bluetooth SIG, Inc. 1999-2001 [1 page retrieved on Sep. 3, 2003]. Retrieved from the Internet <http://www.bluetoothsig.org/assigned-numbers/lmp.htm>.
"Assigned Numbers—Logical Link Control and Adaptation Protocol (L2CAP)", article [online], Bluetooth SIG., Inc. 1999-2001 [2 pages retrieved on Sep. 3, 2003]. Retrieved from the Internet <http://www.bluetoothsig.org/assigned-numbers/l2cap.htm>.
"Assigned Numbers—Service Discovery Protocol (SDP)", article [online], Bluetooth SIG., Inc. 1999-2001 [11 pages retrieved on Sep. 3, 2003]. Retrieved from the Internet <http://www.bluetoothsig.org/assigned-numbers/sdp.htm>.
"Assigned Numbers—Service Discovery Protocol (SDP)", article [online], Bluetooth SIG., Inc. 1999-2001 [5 pages retrieved on Sep. 3, 2003]. Retrieved from the Internet <http://www.bluetoothsig.org/assigned-numbers/host.htm>.
"Assigned Numbers—Company Identifiers", article [online], Bluetooth SIG., Inc. 1999-2001 [3 pages retrieved on Sep. 3, 2003]. Retrieved from the Internet <http://www.bluetoothsig.org/assigned-numbers/company.htm>.
"Assigned Numbers—References", article [online], Bluetooth SIG., Inc. 1999-2001 [6 pages retrieved on Sep. 3, 2003]. Retrieved from the Internet <http://www.bluetoothsig.org/assigned-numbers/tail.htm>.
"All About ISOC", web page [online], Internet Society, 2002 [2 pages retrieved on Oct. 23, 2003]. Retrieved from the Internet: <http://www.isoc.org/isoc/>.
"All About ISOC: Conferences—NDSS", web page [online], Internet Society, 2002 [1 page retrieved on Oct. 23, 2003]. Retrieved from the Internet: <http://www.isoc.org/isoc/conferences/ndss/>.
"Internet Society (ISOC): All About The Internet", web page [online], Internet Society, 2002 [1 page retrieved on Oct. 23, 2003]. Retrieved from the Internet: <http://www.isoc.org/isoc/conferences/ndss/02/>.
"NDSS Conference Proceedings: 2002", web page [online], Internet Society [2 pages retrieved on Oct. 23, 2003]. Retrieved from the Internet: <http://www.isoc.org/isoc/conferences/ndss/02/proceedings/>.
Balfanz et al. "Talking to Strangers: Authentication in Ad-Hoc Wireless Networks", Xerox Palo Alto Research Center, (Date Unknown), 13 pages.

Kammer et al., "Bluetooth Application Developer's Guide: The Short Range Interconnect Solution", Syngress Publishing, Inc., 2002, pp. 1-68.

PCT Search Report (Aug. 31, 2004).

EPO Communication, 4 pgs. (Oct. 17, 2005).

U.S. Appl. No. 10/662,470, filed Sep. 16, 2003, Ekberg et al.

U.S. Appl. No. 10/784,215, filed Feb. 24, 2004, Sovio et al.

Bobba et al., Bootstrapping Security Associations for Routing in Mobile Ad-Hoc Workstations, IEEE Global Telecommunications Conference Proceedings; San Francisco, CA Dec. 1-5, 2003, IEEE Global Telecommunications Conference Proceedings, NY, NY: IEEE US, vol. 7 of 7; Dec. 1, 2003; pp. 1511-1513; GLOBCOM 2003; ISBN: 0-7803-7974-8.

"Windows NT Workstation"; Nov. 2, 2003; pp. 1-14; XP00232988; Retrieved from Internet: www.meetsoon.com/sid3.html; Apr. 11, 2005.

Kolsi et al.; "MIDP 2.0 Security Enhancements" System Sciences, 2004; Proceedings of the 37 Annual Hawaii International Conference on Jan. 5-8, 2004, Piscataway, NJ; IEEE, Jan. 5, 2004, pp. 287-294, XP010682881; ISBN: 0-7695-2056-1.

PCT International Search for PCT/IB2006/001347, Oct. 24, 2006, 4 pages.

Kanter T. G.; "HotTown, Enabling Context-Aware and Extensible Mobile Interactive Spaces"; IEEE Wireless Communications, IEEE Service Center, Piscataway, NJ, US, vol. 9, No. 5; (Oct. 1, 2002) pp. 18-27.

\* cited by examiner

DEVICE DETECTION AND SERVICE DISCOVERY SYSTEM AND METHOD FOR A MOBILE AD HOC COMMUNICATIONS NETWORK

CROSS-REFERENCE TO A RELATED APPLICATION

This application for letters patent is a continuation-in-part of U.S. patent application Ser. No. 10/284,135, titled "DEVICE DETECTION AND SERVICE DISCOVERY SYSTEM AND METHOD FOR A MOBILE AD HOC COMMUNICATIONS NETWORK", and filed in the United States Patent and Trademark Office on Oct. 31, 2002 now U.S. Pat. No. 6,909,721. This application for letters patent is also related to and incorporates by reference U.S. patent application Ser. No. 10/662,470, titled "MECHANISM FOR IMPROVING CONNECTION CONTROL IN PEER-TO-PEER AD-HOC NETWORKS", and filed in the United States Patent and Trademark Office on Sep. 16, 2003. This application for letters patent is also related to and incorporates by reference U.S. patent application Ser. No. 10/662,469, titled "APPLICATION CONTROL IN PEER-TO-PEER AD-HOC COMMUNICATION NETWORKS", and filed in the United States Patent and Trademark Office on Sep. 16, 2003. The assignee is the same in this continuation-in-part patent application, the parent patent application, and the related patent applications.

FIELD OF THE INVENTION

The disclosed invention relates, in general, to communication between devices connected to a wireless communications network. In particular, the disclosed invention is a system and method for performing device detection and service discovery in a mobile ad hoc communications network.

BACKGROUND OF THE INVENTION

Short-range wireless systems have a range of less than one hundred meters, but may connect to the Internet to provide communication over longer distances. Short-range wireless systems include, but are not limited to, a wireless personal area network (PAN) and a wireless local area network (LAN). A wireless PAN uses low-cost, low-power wireless devices that have a typical range of ten meters. An example of a wireless PAN technology is the Bluetooth Standard. The Bluetooth Standard operates in the 2.4 GHz Industrial, Scientific, and Medical (ISM) band and provides a peak air-link speed of one Mbps and a power consumption low enough for use in personal, portable electronics such as a personal digital assistance or mobile phone. A description of the Bluetooth communication protocol and device operation principles is in *Bluetooth Special Interest Group, Specification of the Bluetooth Standard*, version 1.0B, volumes 1 and 2, December 1999. A wireless LAN is more costly than a wireless PAN, but has a longer range. An example of a wireless LAN technology is the IEEE 802.11 Wireless LAN Standard and the HIPERLAN Standard. The HIPERLAN Standard operates in the 5 GHz Unlicensed-National Information Infrastructure (U-NII) band and provides a peak airlink speed between ten and one hundred Mbps.

An ad hoc network is a short-range wireless system comprising an arbitrary collection of wireless devices that are physically close enough to exchange information. An ad hoc network is constructed quickly with wireless devices joining and leaving the network as they enter and leave the proximity of the remaining wireless devices. An ad hoc network also may include one or more access points, that is, stationary wireless devices operating as a stand-alone server or as gateway connections to other networks.

In the future, the Bluetooth Standard will likely support the interconnection of multiple piconets to form a multi-hop ad hoc network, or scatternet. In a scatternet, a connecting device forwards traffic between different piconets. The connecting device may serve as a master device in one piconet, but as a slave device or a master device in another piconet. Thus, the connecting devices join the piconets that comprise a scatternet by adapting the timing and hop sequence to the respective piconet and possibly changing the roles that they serve from a master device to a slave device.

A Bluetooth device includes, but is not limited to, a mobile telephone, personal or laptop computer, radio-frequency identification tag, and personal electronic device such as a personal digital assistant (PDA), pager, or portable-computing device. Each Bluetooth device includes application and operating system programs designed to find other Bluetooth devices as they enter and leave the communication range of the network. The requesting Bluetooth device in a client role and the responding Bluetooth device in a server role establish a link between the two devices. The requesting and responding Bluetooth device use the link and a service discovery protocol to discover the services offered by the other Bluetooth device and how to connect to those services.

Prior art systems follow similar patterns of behavior for service discovery protocols. A service description, created using a description language and an appropriate vocabulary, is advertised or made available for query matching. Some prior art systems advertise the service description by pushing the description to a directory and requiring the advertisers to discover the directory. Other prior art systems advertise the service description by making the descriptions available for peer-to-peer discovery. A client device that needs to discover the service description composes a query using a query language and a matching vocabulary and uses either a query protocol or a decentralized query-processing server to deliver the query.

Service discovery protocols in the prior art systems require sending and replying to inquiry messages. If no other device is present, the inquiry messages are sent in vain. To avoid excessive power consumption, the prior art systems typically require a human user to manually initiate device detection when another device of interest is present. For example, a human user manually initiates device detection when connecting a cellular telephone to a laptop computer to handle data communications or when connecting a wireless headset to a laptop computer to deliver digital audio. These prior art systems rely upon three assumptions. First, an application can be freely started because the presence of its services is guaranteed. Second, an application performs service discovery when it first needs a service. Third, the composition of the network does not change during the lifetime of the application.

Thus, there is a need for a device detection and service discovery protocol that will avoid excessive power consumption and allow an application resident in one device to automatically find a counterpart application or some other resource resident in any of the remaining devices within the ad hoc communications network. The protocol does not require a human user to manually initiate device detection to find the counterpart application or other resource. Furthermore, the protocol will accommodate a network environment in which the presence of a particular service is not guaranteed and in which the composition of the network is dynamic because devices frequently enter and leave the network. The disclosed invention addresses this need.

SUMMARY OF THE INVENTION

A computer system, method, and computer program product for performing device detection and service discovery in a mobile ad hoc communications network. The method comprises conducting an inquiry of the mobile ad hoc communications network to discover nearby devices. If the inquiry indicates that the nearby devices may include a middleware layer, the method further comprises creating a connection to each of the nearby devices and confirming whether each of the nearby devices include the middleware layer. For each of the nearby devices that include the middleware layer, the method further comprises executing the middleware layer to perform application and service discovery, and to launch applications and services.

In one embodiment, the mobile ad hoc communications network is a Bluetooth network. Conducting the inquiry includes sending a Bluetooth inquiry command and receiving a Bluetooth inquiry result command that includes an indication that the device may include the middleware layer. Creating the connection to a device that may include the middleware layer includes sending a Bluetooth paging request message to the device and receiving a Bluetooth paging accept message. Confirming that the device includes the middleware layer includes sending a recognition request message to the device and receiving a recognition response message. Executing the middleware layer to perform application and service discovery includes receiving a notification message from a device with a copy of a local application directory, storing an update to a combined application directory based on a comparison of the local and combined application directory, and sending the update to the combined application directory to each device in the Bluetooth network. In addition, executing the middleware layer includes launching a local application based on a reference in the combined application directory, and connecting the local application to a counterpart application executing on the device.

BRIEF DESCRIPTION OF THE DRAWINGS

The accompanying figures best illustrate the details of the device detection and service discovery system and method for a mobile ad hoc communications network, both as to its structure and operation. Like reference numbers and designations in these figures refer to like elements.

DETAILED DESCRIPTION OF THE INVENTION

Figure 1:
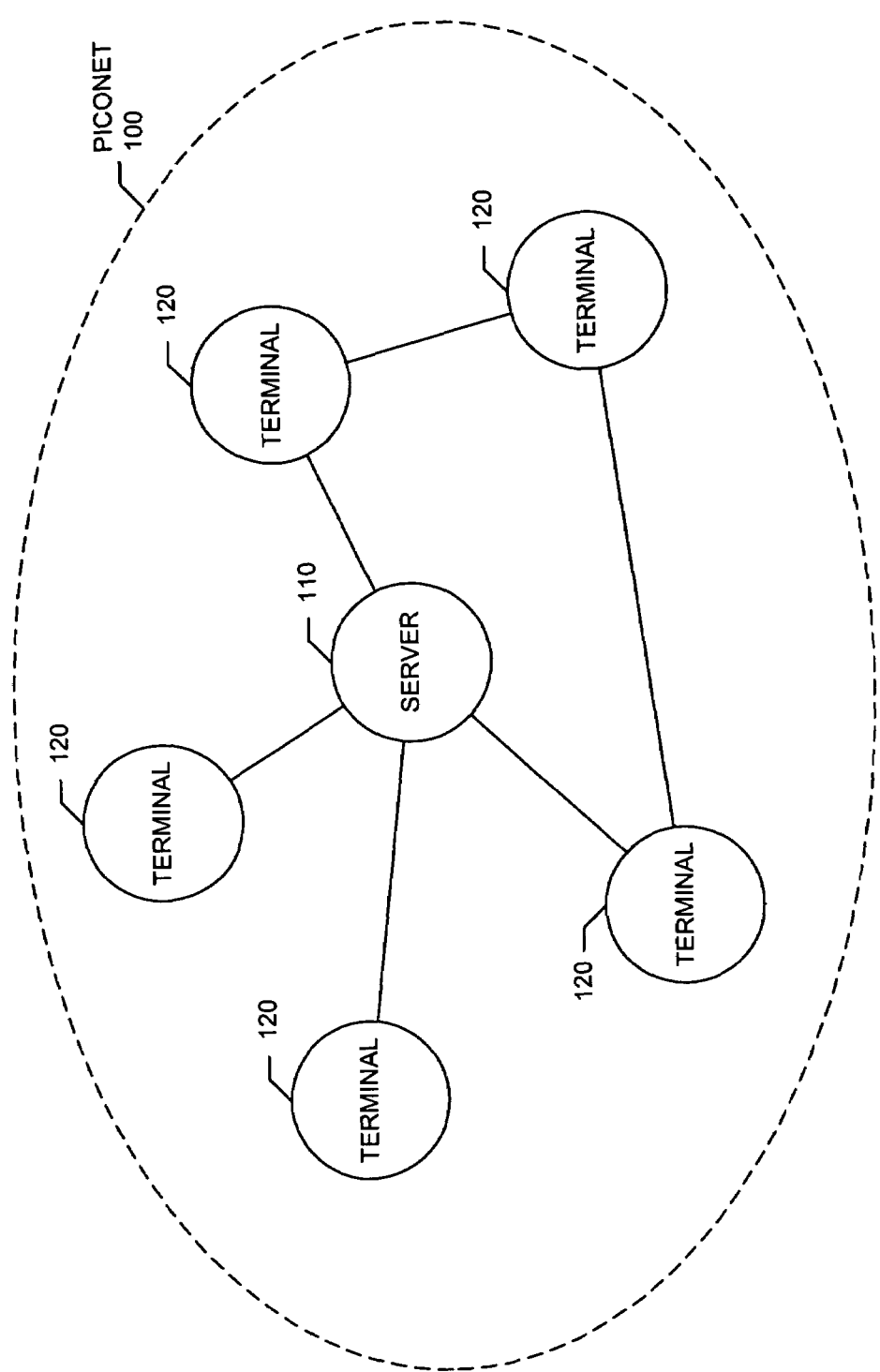
FIG. 1 is a network diagram that illustrates the interaction of the devices that comprise a mobile ad hoc communications network, in accordance with one embodiment of the present invention.

FIG. 1 is a network diagram that illustrates the interaction of the devices that comprise a mobile ad hoc communications network, in accordance with one embodiment of the present invention. In one embodiment, the mobile ad hoc communications network is a Bluetooth piconet that includes one master device and up to seven active slave devices. As shown in FIG. 1, piconet 100 includes server 110 and five instances of terminal 120. Server 110 maintains the network clock and is the communication manager for each instance of terminal 120. Server 110 typically initiates an exchange of data with an instance of terminal 120. Two instances of terminal 120 typically communicate through the server 110 however, if two instances of terminal 120 communicate directly, one instance will assume the role of server, or master, and the other instance will assume the role of client, or slave.

Each device in the mobile ad hoc communications network will either assume the role of a terminal device or a server device. A terminal device is a consumer of services that a single user operates. A terminal device includes devices such as a mobile phone or PDA. A server is typically a stationary device and only produces services. A server device creates a hotspot around them for using their services. "Hotspot" refers to the radio coverage area provided by the server device for detecting devices and discovering services offered by the applications hosted in the server. If the server device is not stationary, one of the terminal devices in the network will assume the role of application directory server and perform device detection and service discovery functions for the remaining terminal devices in the network. The disclosed invention introduces two roles among such terminal devices, application directory servers and terminals, where application directory servers serve terminals in device detection and service discovery. If stationary servers with hotspots exist, servers typically act as application directory servers however, device detection and service discovery is possible without such a stationary server because one of the terminals will assume the application directory server duties.

The disclosed invention categorizes an application as a server-based application, terminal-to-terminal application, foreground application, background application, or generic application component. A server-based application requires a server to produce a service. A terminal-to-terminal application requires at least two terminal devices to implement a service without the presence of a server device. A foreground application is an application resident in a terminal device that a user accesses via the user interface of the terminal device. A background application is an application resident in a terminal device that may start without any intervention by the user. A generic application component can be used either as a standalone application or as a component of another application.

An application may be further categorized as either active, passive, new, or rejected. An active application is a foreground or background application that is resident in (i.e., stored in memory) the terminal. A passive application is resident in the terminal, but has not yet been started. In another embodiment, the passive application is started, but is not actively looking for other instances of the same application. A new application is not yet resident in the terminal, but might be in the future. A rejected application is not resident in the terminal and has been marked by the user as an application that should never be resident in the terminal. In another embodiment, the rejected application was once resident in the terminal, but was subsequently deleted and marked as rejected. In yet another embodiment, the rejected application never resided in the terminal, but is of a type of application that the user has marked as rejected.

Service discovery in a mobile ad hoc communications network differentiates between a resident application and an unloaded application. A resident application is stored in the terminal memory and loaded as either a foreground application or a background application. An unloaded application is not yet stored or loaded in the terminal, but has been accepted by the user. Typically, when an application was previously used, but has been overwritten to reclaim space, the application is considered unloaded. Thus, starting an unloaded application may require first downloading the application.

Service discovery from the perspective of the terminal device requires categorizing the status of an application as either an active resident application, active unloaded application, passive resident application, passive unloaded application, rejected application, or new application. An active resident application is loaded in the terminal and looking for peers, servers, or clients. An active unloaded application is not loaded in the terminal, but is still looking for such counterpart applications that could be automatically downloaded if found interesting. A passive resident application is loaded in the terminal, but is not looking for counterpart applications. A passive unloaded application is not loaded in the terminal, but was once accepted by the user. A rejected application is an application that a user has requested to exclude from the terminal device. A new application is not loaded in the terminal device, but the user might have seen an application in an earlier server for instance.

Figure 2A:
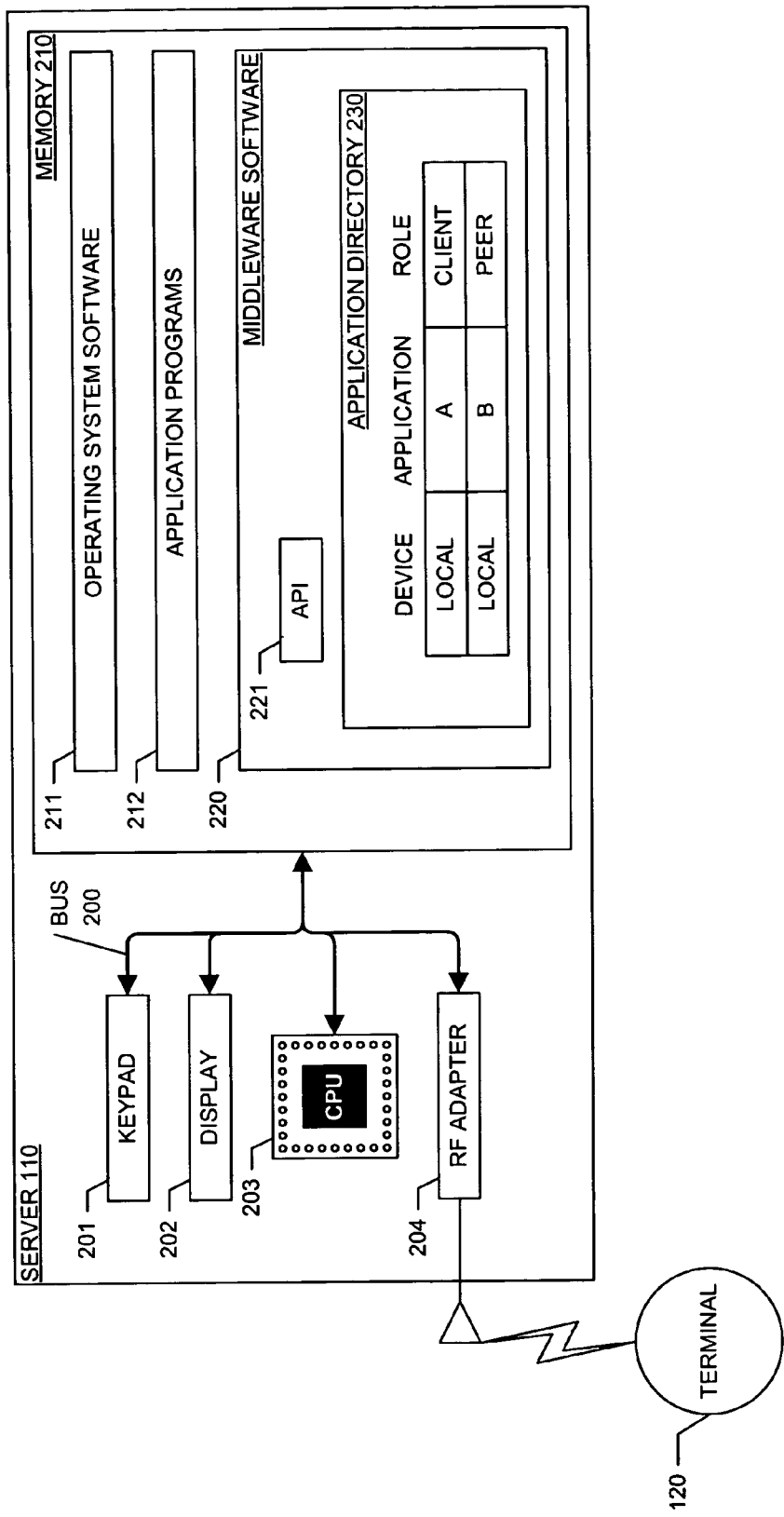
FIG. 2A is a block diagram that illustrates the hardware and software components comprising server 110 shown in FIG. 1, in accordance with one embodiment of the present invention.

FIG. 2A is a block diagram that illustrates the hardware and software components comprising server 110 shown in FIG. 1, in accordance with one embodiment of the present invention. Server 110 is a general-purpose wireless device. Bus 200 is a communication medium that connects keypad 201, display 202, central processing unit (CPU) 203, and radio frequency (RF) adapter 204 to memory 210. RF adapter 204 connects via a wireless link to terminal 120 and is the mechanism that facilitates network traffic between server 110 and terminal 120.

CPU 203 performs the methods of the disclosed invention by executing the sequences of operational instructions that comprise each computer program resident in, or operative on, memory 210. Memory 210 includes operating system software 211, application programs 212, and middleware software 220. Operating system software 211 controls keypad 201, display 202, RF adapter 204, and the management of memory 210. Application programs 212 control the interactions between a user and server 110. Middleware software 220 includes an application program interface (API) 221 that help an application program running on server 110 find and communicate with a counterpart application running on terminal 120. To quickly locate each application, middleware software 220 also includes application directory 230 to track the role assumed by each application that is resident in each device in piconet 100.

Figure 2B:
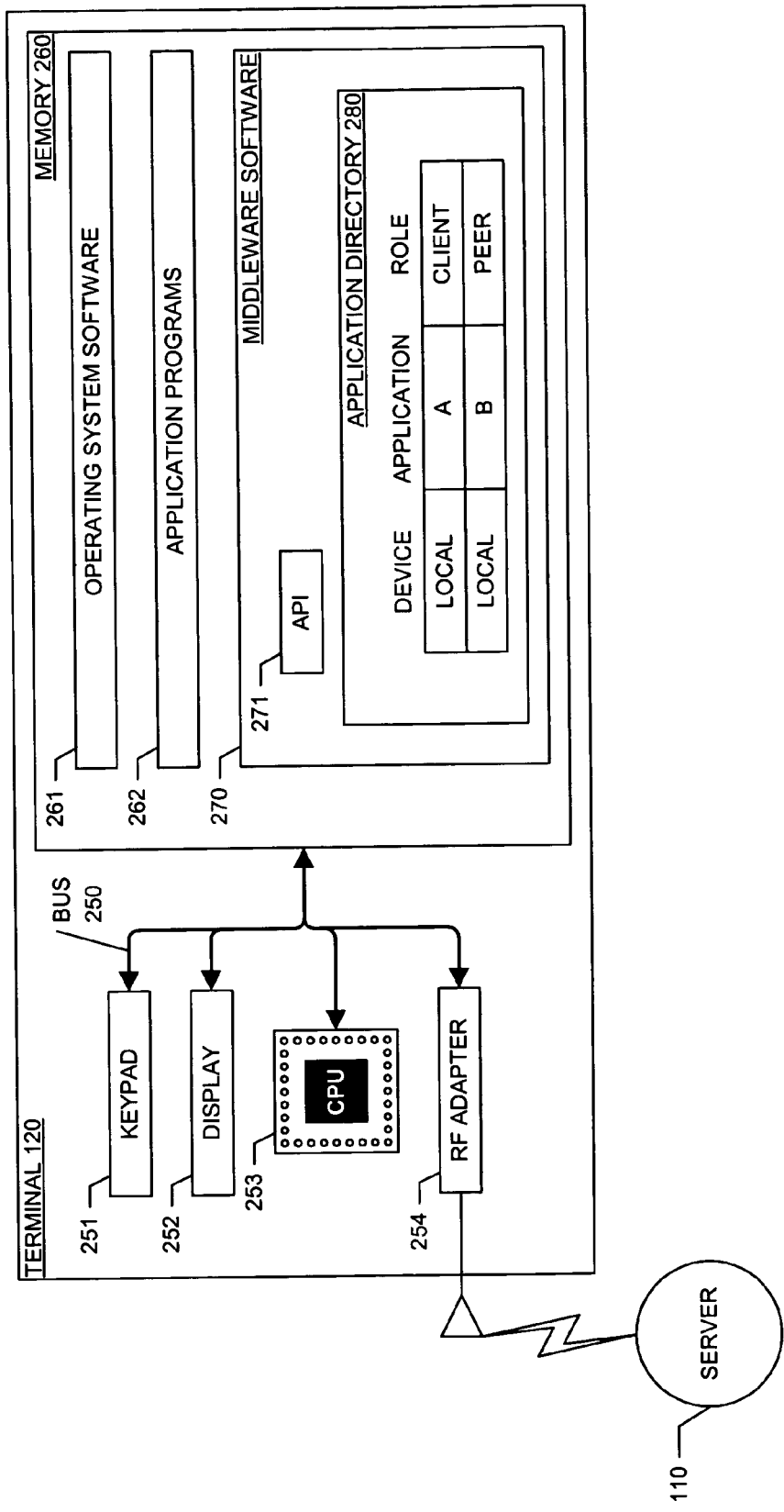
FIG. 2B is a block diagram that illustrates the hardware and software components comprising terminal 120 shown in FIG. 1, in accordance with one embodiment of the present invention.

FIG. 2B is a block diagram that illustrates the hardware and software components comprising terminal 120 shown in FIG. 1, in accordance with one embodiment of the present invention. Terminal 120 is a general-purpose wireless device. Bus 250 is a communication medium that connects keypad 251, display 252, CPU 253, and RF adapter 254 to memory 260. RF adapter 254 connects via a wireless link to server 110 or another terminal 120 and is the mechanism that facilitates network traffic between server 110 and terminal 120.

CPU 253 performs the methods of the disclosed invention by executing the sequences of operational instructions that comprise each computer program resident in, or operative on, memory 260. Memory 260 includes operating system software 261, application programs 262, and middleware software 270. Operating system software 261 controls keypad 251, display 252, RF adapter 254, and the management of memory 260. Application programs 262 control the interactions between a user and terminal 120. Middleware software 270 includes an API 271 that help an application program running on terminal 120 find and communicate with a counterpart application running on server 110 or another terminal 120. To quickly locate each application, middleware software 270 also includes application directory 280 to track the role assumed by each application that is resident in each device in piconet 100.

In one embodiment, the configuration of memory 210 and memory 260 is identical. In another embodiment, the configuration of memory 210 and memory 260 only includes the software necessary to perform the essential tasks of server 110 and terminal 120, respectively. For example, if terminal 120 needs to receive a general inquiry access code, but does not need to send a general inquiry access code message, only the software that receives this message will reside in memory 260.

An application executing on a terminal is constantly searching for a counterpart application, that is, another instance of the same application that can communicate with the application. Each instance of an application assumes a particular role. Communication between an application and a counterpart application is only meaningful if the roles are complementary. For example, an application that assumes the role of "client" can communicate with a counterpart application that assumes the role of "server". Middleware software is a software layer with an API that negotiates the communication between two applications to help an application find a counterpart application with the correct role. Thus, an application installed in a terminal and activated, will query the API for a continuous stream of new counterpart applications that are of interest.

A new application is installed by "installer" applications that use middleware for finding counterparts and installing the new application into the local storage of a terminal. The actual finding and selection of new applications takes place in the application level. Initially, the installer application will be a dedicated "browser-supplier" (i.e., client-server) application that accesses counterpart applications in servers, browses their available application databases, allows a user to pick the applications to install, and downloads and installs the new applications. Later, the corresponding functionality may be added to a wireless access protocol (WAP) and hypertext markup language (HTML) browsers.

Service discovery is viewed as a three-step process. First, new potential applications are found and will be considered for installation. Second, active installed applications begin to search for counterpart application. Third, active installed applications begin searching for common resources such as printers (i.e., resource discovery). The disclosed invention relies upon the applications to perform resource discovery. Typically, a terminal application communicates with its counterpart application and use local (i.e., server) resources. If an application uses a private resource, the associated service discovery is implemented by the application in a standard (e.g., Bluetooth or Bluetooth/Java) way not supported by the terminal middleware software.

Figure 3A:
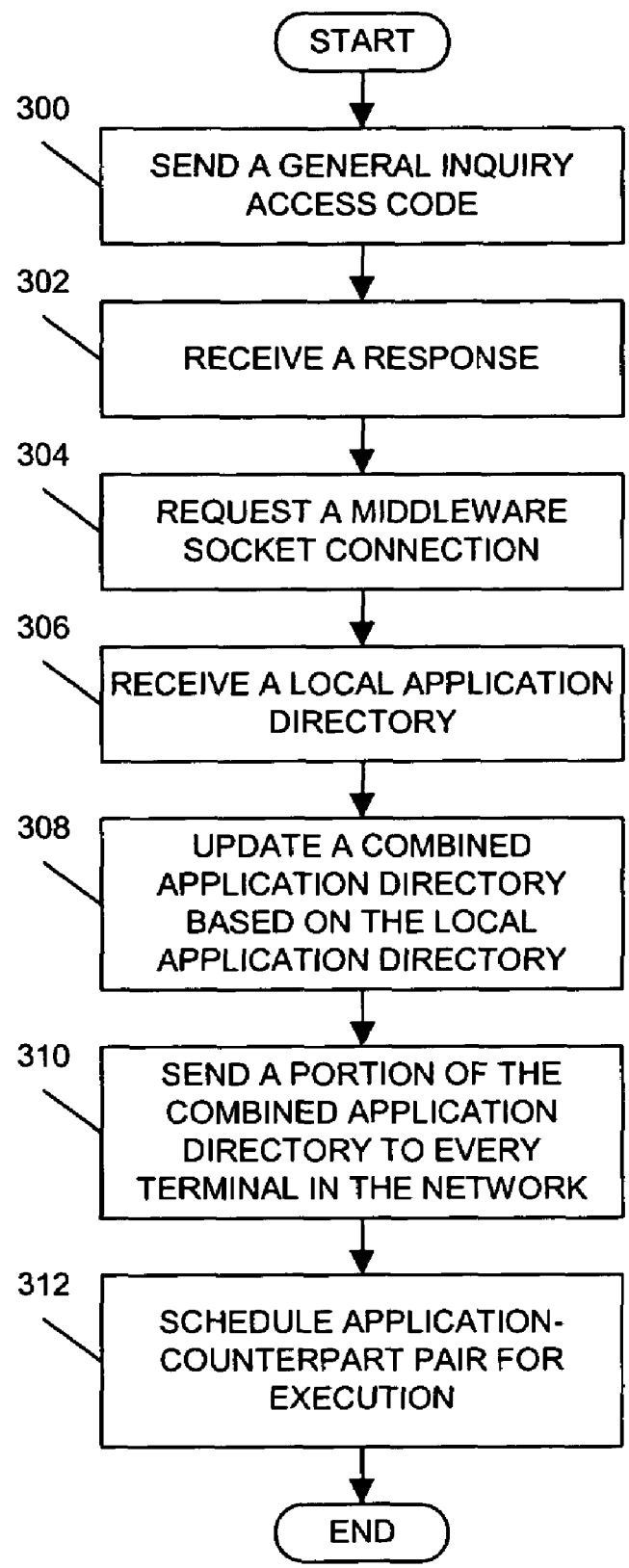
FIG. 3A is a flow diagram of an embodiment of server 110 performing device detection and service discovery for a mobile ad hoc communications network.

FIG. 3A is a flow diagram of an embodiment of server 110 performing device detection and service discovery for a mobile ad hoc communications network. The process begins when server 110 sends a general inquiry access code message to terminal 120 (step 300). Terminal 120 receives the message and sends an acknowledgment response message to server 110 (step 302). Server 110 accesses middleware software 220 to request a socket connection with terminal 120 (step 304). In response to establishing the socket connection, server 110 receives a message from terminal 120 that includes a local application directory listing all of the applications that are locally resident on terminal 110 (step 306). Server 110 compares the list of applications resident on terminal 120 to a combined application directory resident on server 110. Server 110 updates the combined application directory by adding to the combined application directory each entry in the local application directory that does not appear in the combined application directory (step 308). Server 110 sends a portion of the updated combined application directory to each terminal 120 in piconet 100 (step 310). The portion may vary for each terminal 120 and includes each entry in the combined application directory that is a counterpart application to an application resident in terminal 120. In another embodiment, server 110 sends the entire combined application directory to each terminal 120 in piconet 100 and relies upon terminal 120 to retain the pertinent entries. Instances of middleware software in terminal 120 and server 110 begin to schedule the newly found counterpart application pairs for execution (step 312). In one embodiment, the scheduled applications make use of any other Bluetooth profile and protocol. In another embodiment, an application that is an installer application may suggest to the user other applications that the user should download. Once server 110 downloads and starts a new application, counterpart matching repeats and the new application becomes a part of the middleware scheduling.

Figure 3B:
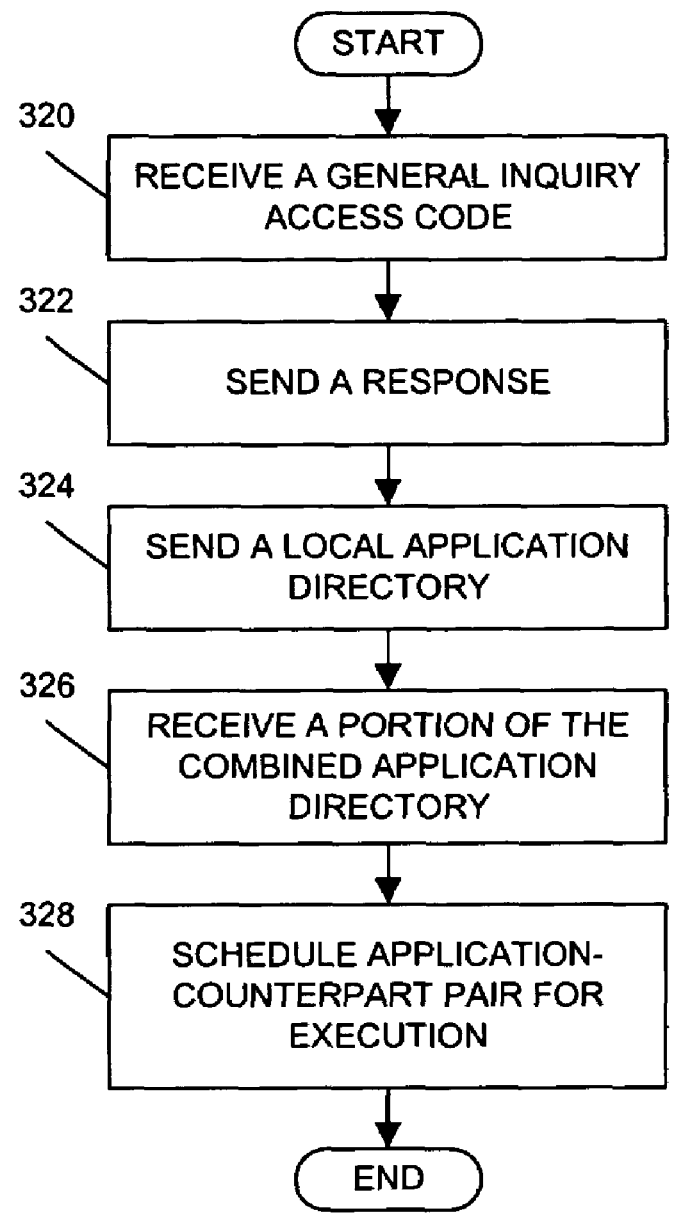
FIG. 3B is a flow diagram of an embodiment of terminal 120 performing device detection and service discovery for a mobile ad hoc communications network.

FIG. 3B is a flow diagram of an embodiment of terminal 120 performing device detection and service discovery for a mobile ad hoc communications network. The process begins when terminal 120 receives a general inquiry access code message from server 110 (step 320). Terminal 120 generates and sends an acknowledgment response message to server 110 (step 322). Terminal 120 sends a message to server 110 that includes a local application directory that includes all of the applications that are locally resident on terminal 110 (step 324). Server 110 compares the list of applications resident on terminal 120 to a combined application directory resident on server 110. Server 110 updates the combined application directory by adding to the combined application directory each entry in the local application directory that does not appear in the combined application directory. Terminal 120 receives from server 110 a portion of the updated combined application directory (step 326). Server 110 customizes the portion for terminal 120 to include each entry in the combined application directory that is a counterpart application to an application resident in terminal 120. In another embodiment, server 110 sends the entire combined application directory to terminal 120 and relies on terminal 120 to retain the pertinent entries. Instances of middleware software in terminal 120 and server 110 begin scheduling these newly found counterpart application pairs for execution (step 328).

Figure 4A:
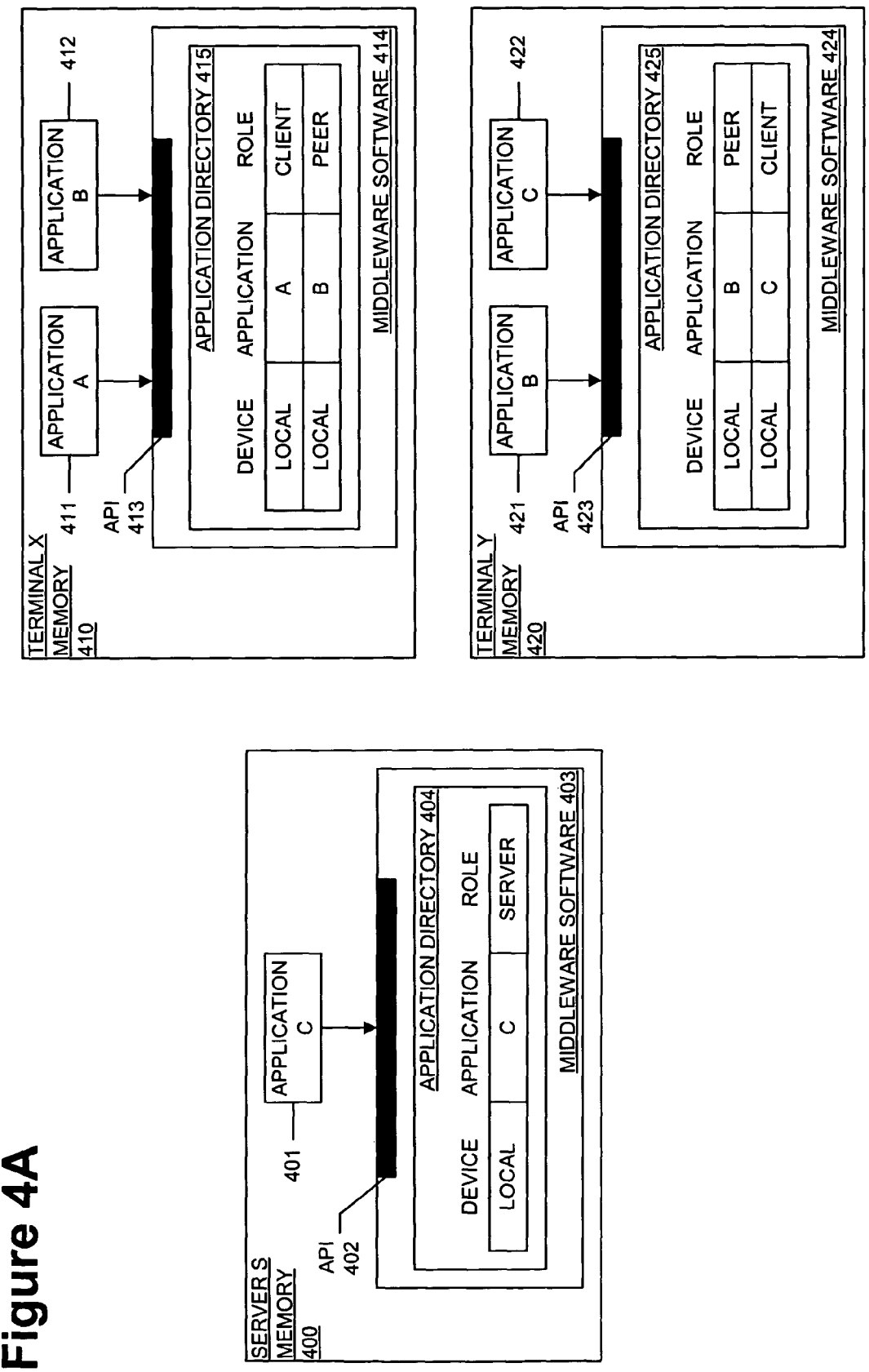
FIG. 4A is an exemplary block diagram of the data flow before a terminal enters a mobile ad hoc communications network.
Figure 4B:
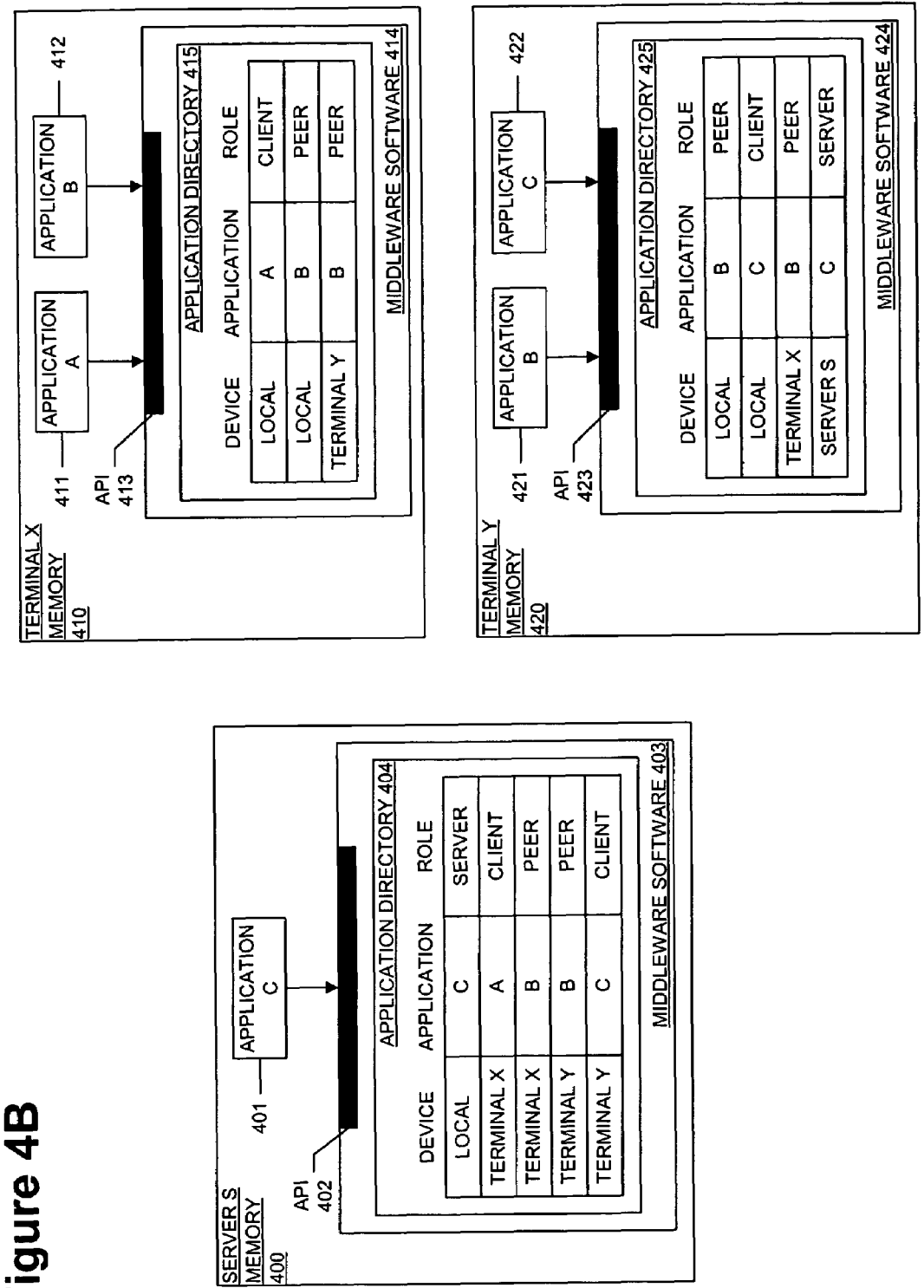
FIG. 4B shows the exemplary block diagram of FIG. 4A after the terminal enters the mobile ad hoc communications network.

FIGS. 4A and 4B are exemplary block diagrams showing the content of the application directory before and after terminal X and terminal Y enter a mobile ad hoc communications network served by server S. FIG. 4A shows the configuration of application directory 404, application directory 415, and application directory 425 before terminal X and terminal Y enter a communication network managed by server S, a master device. Application C 401 resides in server S memory 400 and accesses middleware software 403 via API 402. Middleware software 403 registers application C 401 with application directory 404 by adding a table entry to indicate that application C resides in the local device (i.e., server S) and assumes the role of server. Application A 411 and application B 412 reside in terminal X memory 410 and access middleware software 414 via API 413. Middleware software 414 registers application A 411 and application B 412 with application directory 415 by adding a table entry to indicate that application A resides in the local device (i.e., terminal X) and assumes the role of client and that application B resides in the local device (i.e., terminal X) and assumes the role of peer. Application B 421 and application C 422 reside in terminal Y memory 420 and access middleware software 424 via API 423. Middleware software 424 registers application B 421 and application C 422 with application directory 425 by adding a table entry to indicate that application B resides in the local device (i.e., terminal Y) and assumes the role of peer and that application C resides in the local device (i.e., terminal Y) and assumes the role of client.

FIG. 4B shows the configuration of application directory 404, application directory 415, and application directory 425 after terminal X and terminal Y enter the communication network managed by server S, a master device. Server S assumes the role of an application directory server (ADS) and mediates the registration of the applications residing in each device in piconet 100. Server S adds a table entry to application directory 404 for each application residing in a device on piconet 100. Thus, server S adds an entry for application A residing in terminal X in a client role, application B residing in terminal X in a peer role, application B residing in terminal Y in a peer role, and application C residing in terminal Y in a client role. Server S also updates application directory 415 in terminal X and application directory 425 in terminal Y with application registrations that may be interesting to those terminal devices. As shown in FIG. 4B, terminal X and terminal Y both host application B in a peer role. Since, a peer-to-peer communication session between application B on terminal X and application B on terminal Y is likely, server S adds an entry to application directory 415 for application B residing in terminal Y in a peer role and an entry to application directory 425 for application B residing in terminal X in a peer role. Also, since a client-server communication session between application C on terminal Y and application C on server S is likely, server S adds an entry to application directory 425 for application C residing in server S in a server role. Finally, there is no counterpart in piconet 100 for application A on terminal X.

As shown in FIGS. 4A and 4B, the disclosed data items for each entry in the middleware software application directory server include a device identifier (e.g., "local", an address, or other unique identifier), an application identifier (e.g., application name or other unique identifier), and a role for the application (e.g., "client", "server", "peer", etc.). In another embodiment, the data items can be expanded to include fields for the local applications (i.e., device="local") and fields for remote applications in other terminals or servers. The fields for the local applications include:

Name—An identifier for the application (e.g., supplier name and data to compare different versions and hardware variants);

My_role—The role that the application takes in the local device;

Partner_role—The role that the application assumes from interesting counterparts (e.g., peer, client, and server are the most common roles);

Residency—Either RESIDENT (installed and currently in memory), UNLOADED (installed once, not currently in memory, but can be re-downloaded automatically), REJECTED (indicates to the new application installer that it should ignore the application), or NEW (the application is not installed or rejected);

State—Either RUNNING (has communications, is now working with its remote counterparts, but there may be either only one, or more, applications that can use the communications at a time), WAITING (in execution but does not have any communications), STARTABLE (active, if a matching peer with the right partner_role is found, the middleware software starts this application, downloading the software first if needed), COMPLETE (all counterpart applications are aware), or PASSIVE (user must do something to start application);

Type—Either FOREGROUND (when the application terminates, the state will be PASSIVE), or BACKGROUND (if the application terminates, the state will be STARTABLE);

Unload—Either AUTOMATIC (middleware may remove code when the application has terminated), or UNINSTALL (user must confirm removals);

Icon—Creates a visual image of the application for the user; and

Timeout—Sets a time limit that the middleware software uses to detect, for example, when the application is in an unproductive software loop.

The fields for the remote applications include:

Device—An address for establishing communications with the terminal or server storing the application instance;

Name—An identifier for the application; and

My_role—The role that the application takes in the remote device.

The client-server roles of the applications are independent of the roles of the devices as a terminal device and an application directory server. Typically, the device acting as an application directory server hosts applications acting in a server role and the terminal devices act in the client role for the same application. In another embodiment, two terminal devices each send a general inquiry access code message and listen for a reply. The terminal device that receives a response first will assume the server role and proceed according to the procedure in FIG. 3A. Another terminal device that receives the inquiry message will assume the terminal role, and proceed according to FIG. 3B. Thus, the disclosed invention supports terminal-to-terminal scenarios (e.g., one of identical handheld devices automatically becoming an ADS) and does not require predetermined application directory servers.

Figure 5:
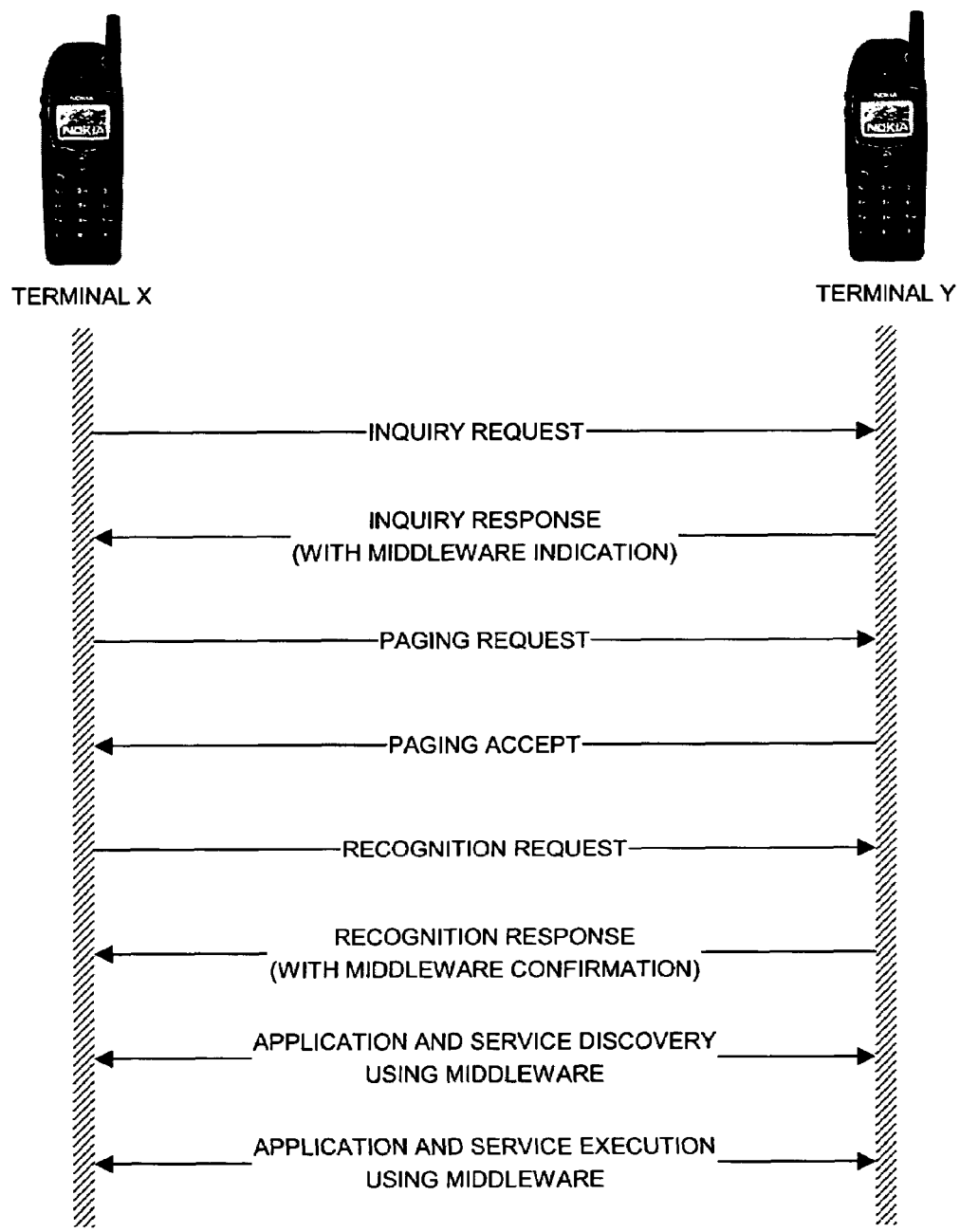
FIG. 5 is a flow diagram of an embodiment of a process that illustrates the message flow during establishment of a communication session between terminal X and terminal Y in a mobile ad hoc communications network.

FIG. 5 is a flow diagram of an embodiment of a process that illustrates the message flow during establishment of a communication session between terminal X and terminal Y in a mobile ad hoc communications network. In one embodiment, terminal X and terminal Y are mobile devices such as terminal 120 shown in FIG. 1 and FIG. 2B. In another embodiment, terminal X is a mobile device such as terminal 120 shown in FIG. 1 and FIG. 2B and terminal Y is a mobile device such as server 110 shown in FIG. 1 and FIG. 2A.

As shown in FIG. 5, terminal X initiates the communication by sending an inquiry request message to the mobile ad hoc communications network. Since terminal Y is a nearby device, terminal Y receives the inquiry request message and sends an inquiry response message to terminal X. In one embodiment, the inquiry request message is a Bluetooth inquiry command and the inquiry response message is a Bluetooth inquiry result command. In another embodiment, the inquiry request message is a Bluetooth inquiry command and the inquiry response message is a Bluetooth inquiry result command modified to indicate that the terminal sending the Bluetooth inquiry result command includes a middleware layer. In one embodiment, the middleware layer includes dedicated middleware software providing advanced application and service discovery and execution. In one embodiment, the modification to the Bluetooth inquiry result command is to the Class of Device (CoD) parameters. For example, if the terminal sending the Bluetooth inquiry result command includes the middleware layer, the terminal will set at least the "ad hoc networking aware" bit (bit 16) to on (1). Alternatively, if the terminal sending the Bluetooth inquiry result command includes the middleware layer, the terminal will set the "ad hoc networking aware" bit (bit 16) to on (1), and the "location info" bit (bit 17) to off (0). Alternatively, if the terminal sending the Bluetooth inquiry result command includes the middleware layer, the terminal will set the "ad hoc networking aware" bit (bit 16) to on (1), and the "telephony capable" bit (bit 22) to on (1). Alternatively, if the terminal sending the Bluetooth inquiry result command includes the middleware layer, the terminal will set the "ad hoc networking aware" bit (bit 16) to on (1), the "location info" bit (bit 17) to off (0), and the "telephony capable" bit (bit 22) to on (1). In yet another embodiment, the modification to the Bluetooth inquiry result command is not necessary, if a dedicated indication parameter to indicate the presence of the middleware software is introduced to the Bluetooth inquiry result command specifications.

Following the inquiry, as shown in FIG. 5, terminal X may create a connection to each nearby device indicating possible possession of the middleware layer by the inquiry response message, such as terminal Y, by sending a paging request message. If terminal Y does not indicate possible possession of the middleware layer (e.g., by setting the "ad-hoc networking aware" bit (bit 16) to off (0)), no paging request message is transmitted and the communication session is disconnected. After conducting an inquiry including an indication that terminal Y possibly includes a middleware layer, terminal X sends the paging message request, as discussed above. Terminal Y receives the paging request message and optionally sends a paging accept message to accept the connection request. In one embodiment, the paging request message is a Bluetooth create connection command and the paging accept message is a Bluetooth accept connection request command.

Following the connection to each nearby device, as shown in FIG. 5, terminal X sends a recognition request message to confirm whether a nearby device such as terminal Y definitely includes the middleware layer. Terminal Y receives the recognition request message and sends a recognition response message to terminal X. In one embodiment, the receipt of the recognition response message is confirmation that terminal Y includes the middleware layer. In another embodiment, the content of the recognition response message will indicate whether terminal Y includes the middleware layer. In one embodiment, the recognition request message and the recognition response message utilize the Bluetooth Service Discovery Protocol (SDP). If terminal Y does not include the middleware layer, the communication session may be disconnected.

Following the confirmation that a nearby device such as terminal Y includes the middleware layer, as shown in FIG. 5, terminal X and terminal Y use the middleware layer to discover and launch applications and services. In one embodiment, terminal X and terminal Y use the methods disclosed in the flow diagrams shown in FIG. 3A and FIG. 3B to discover and launch applications and services.

Although the disclosed embodiments describe a fully functioning device detection and service discovery system and method for a mobile ad hoc communications network, the reader should understand that other equivalent embodiments exist. Since numerous modifications and variations will occur to those who review this disclosure, the device detection and service discovery system and method for a mobile ad hoc communications network is not limited to the exact construction and operation illustrated and disclosed. Accordingly, this disclosure intends all suitable modifications and equivalents to fall within the scope of the claims.

We claim:

1. An apparatus, comprising:
   a memory device; and
   a processor disposed in communication with the memory device, the processor configured to:
   conduct an inquiry to discover nearby devices;
   determining, whether a discovered nearby device provides an indication that it may include a middleware software, the middleware software configured for providing application and service discovery;
   when the discovered nearby device does not provide an indication that it may include the middleware software:
   disconnect communication session establishment with the discovered nearby device;
   when the discovered nearby device provides an indication that it may include the middleware software;
   create a wireless short-range communication connection to the discovered nearby device;
   confirm whether said nearby device includes the middleware software by requesting corresponding information from said nearby device via the wireless short-range communication connection; and
   when said nearby device includes the middleware software:
   execute the middleware software to perform application and service discovery with said nearby device.

2. The Apparatus of claim 1, wherein the middleware layer includes a service discovery protocol and at least one computer program, each computer program comprising at least one sequence of operational instructions.

3. The Apparatus of claim 1, wherein when said at least one nearby device includes the middleware layer, the processor is further configured to:
   execute the middleware layer to launch applications and services.

4. The Apparatus of claim 1, wherein to conduct the inquiry, the processor is further configured to:
   send an inquiry request message;
   receive an inquiry response message from said at least one nearby device, the inquiry response message including the indication.

5. The Apparatus of claim 4, wherein the inquiry request message is a Bluetooth inquiry command, and the inquiry response message is a Bluetooth inquiry result command.

6. The Apparatus of claim 5, wherein setting at least one bit in the Bluetooth inquiry result command to at least one predetermined value is the indication.

7. The Apparatus of claim 6, wherein said at least one bit includes at least one of the ad hoc networking aware bit, the location information bit, or the telephony capable bit.

8. The Apparatus of claim 5, wherein setting at least two bits in the Bluetooth inquiry result command to at least one predetermined value is the indication.

9. The Apparatus of claim 8, wherein said at least two bits includes at least two of the ad hoc networking aware bit, the location information bit, or the telephony capable bit.

10. The Apparatus of claim 8, wherein said at least two bits includes the ad hoc networking aware bit, and at least one of the location information bit, or the telephony capable bit.

11. The Apparatus of claim 1, wherein to create the connection, the processor is further configured to:
    send a paging request message directed to said at least one nearby device; and
    receive a paging accept message from said at least one nearby device.

12. The Apparatus of claim 1, wherein to confirm that said at least one nearby device includes the middleware layer, the processor is further configured to:
    send a recognition request message to said at least one nearby device; and
    receive a recognition response message from said at least one nearby device.

13. The Apparatus of claim 12, wherein receipt of the recognition response message confirms that said at least one nearby device includes the middleware layer.

14. The Apparatus of claim 12, wherein the recognition response message includes a confirmation that said at least one nearby device includes the middleware layer.

15. The Apparatus of claim 14, wherein setting at least one bit in the recognition response message to at least one predetermined value is the confirmation.

16. The Apparatus of claim 12, wherein the recognition request message is a Bluetooth Service Discovery Protocol request and the recognition response message is a Bluetooth Service Discovery Protocol response.

17. The Apparatus of claim 1, wherein to execute the middleware layer to perform application and service discovery, the processor is further configured to:
    receive a notification message from said at least one nearby device, the notification message including a local application directory stored in said at least one nearby device;
    store an update to a combined application directory, the update based on a comparison of the local application directory and the combined application directory; and
    send an update message to said at least one nearby device, the update message including an update portion of the combined application directory for updating the local application directory stored in said at least one nearby device.

18. The Apparatus of claim 17, wherein the processor is further configured to:
    launch a local application based on a reference in the combined application directory; and
    connect the local application to a counterpart application executing on said at least one nearby device.

19. A method for performing device detection and service discovery in a mobile ad hoc communications network, comprising:
    conducting an inquiry to discover nearby devices,
    determining, whether a discovered nearby device provides an indication that it may include a middleware software, the middleware software configured for providing application and service discovery;
    when the discovered nearby device does not provide an indication that it may include the middleware software:

disconnect communication session establishment with the discovered nearby device;

when the discovered nearby device provides an indication that it may include the middleware software:

creating a wireless short-range communication connection to discovered nearby device;

confirming whether said nearby device includes the middleware software by requesting corresponding information from said nearby device via the wireless short-range communication connection; and when said nearby device includes the middleware software:

executing the middleware software to perform application and service discovery with said nearby device.

20. The method of claim 19, wherein the middleware layer includes a service discovery protocol and at least one computer program, each computer program comprising at least one sequence of operational instructions.

21. The method of claim 19, wherein when said at least one nearby device includes the middleware layer, the method further comprises:

executing the middleware layer to launch applications and services.

22. The method of claim 19, wherein the conducting of the inquiry further comprises:

sending an inquiry request message; and receiving an inquiry response message from said at least one nearby device, the inquiry response message including the indication.

23. The method of claim 22, wherein the inquiry request message is a Bluetooth inquiry command, and the inquiry response message is a Bluetooth inquiry result command.

24. The method of claim 23, wherein setting at least one bit in the Bluetooth inquiry result command to at least one predetermined value is the indication.

25. The method of claim 24, wherein said at least one bit includes at least one of the ad hoc networking aware bit, the location information bit, or the telephony capable bit.

26. The method of claim 23, wherein setting at least two bits in the Bluetooth inquiry result command to at least one predetermined value is the indication.

27. The method of claim 26, wherein said at least two bits includes at least two of the ad hoc networking aware bit, the location information bit, or the telephony capable bit.

28. The method of claim 26, wherein said at least two bits includes the ad hoc networking aware bit, and at least one of the location information bit, or the telephony capable bit.

29. The method of claim 19, wherein the creating of the wireless short-range connection further comprises:

sending a paging request message to said at least one nearby device; and receiving a paging accept message from said at least one nearby device.

30. The method of claim 19, wherein the confirming further comprises:

sending a recognition request message to said at least one nearby device; and receiving a recognition response message from said at least one nearby device.

31. The method of claim 30, wherein the receiving of the recognition response message confirms that said at least one nearby device includes the middleware layer.

32. The method of claim 30, wherein the recognition response message includes a confirmation that said at least one nearby device includes the middleware layer.

33. The method of claim 32, wherein setting at least one bit in the recognition response message to at least one predetermined value is the confirmation.

34. The method of claim 30, wherein the recognition request message is a Bluetooth Service Discovery Protocol request and the recognition response message is a Bluetooth Service Discovery Protocol response.

35. The method of claim 19, wherein the executing of the middleware layer to perform application and service discovery further comprises:

receiving a notification message from said at least one nearby device, the notification message including a local application directory stored in said at least one nearby device;

storing an update to a combined application directory, the update based on a comparison of the local application directory and the combined application directory; and sending an update message to said at least one nearby device, the update message including an update portion of the combined application directory for updating the local application directory stored in said at least one nearby device.

36. The method of claim 35, further comprising:

launching a local application based on a reference in the combined application directory; and connecting the local application to a counterpart application executing on said at least one nearby device.

37. A computer program product comprising a computer readable medium storing a program code executable in a computer system, said program code comprising:

program code for conducting an inquiry to discover nearby devices;

program code for determining, whether a discovered nearby device provides an indication that it may include a middleware software, the middleware software configured for providing application and service discovery;

when the discovered nearby device does not provide an indication that it may include the middleware software:

disconnect communication session establishment with the discovered nearby device;

program code for-when the discovered nearby device provides an indication that it may include a middleware software , creating a wireless short-range communication connection to the discovered nearby device:

program code for confirming whether said-nearby device includes the middleware software by requesting corresponding information from said nearby device via the wireless short-range communication connection when said nearby device includes the middleware software; and program code for executing the middleware software to perform application and service discovery with said nearby device.

38. The computer program product of claim 37, wherein the middleware layer includes a service discovery protocol and at least one computer program, each computer program comprising at least one sequence of operational instructions.

39. The computer program product of claim 37, the computer recordable and readable medium further storing:

program code for executing the middleware layer to launch applications and services when said at least one nearby device includes the middleware layer.

40. The computer program product of claim 37, wherein the program code for conducting the inquiry further comprises:

program code for sending an inquiry request message; and
program code for receiving an inquiry response message from said at least one nearby device, the inquiry response message including the indication.

41. The computer program product of claim 37, wherein the program code for creating the wireless short-range connection further comprises:

program code for sending a paging request message directed to said at least one nearby device; and
program code for receiving a paging accept message from said at least one nearby device.

42. The computer program product of claim 37, wherein the program code for confirming that said at least one nearby device includes the middleware layer further comprises:

program code for sending a recognition request message to said at least one nearby device; and
program code for receiving a recognition response message from said at least one nearby device.

43. The computer program product of claim 37, wherein the program code for executing the middleware layer to perform application and service discovery further comprises:

program code for receiving a notification message from said at least one nearby device, the notification message including a local application directory stored in said at least one nearby device;
program code for storing an update to a combined application directory, the update based on a comparison of the local application directory and the combined application directory; and
program code for sending an update message to said at least one nearby device, the update message including an update portion of the combined application directory for updating the local application directory stored in said at least one nearby device.

44. The computer program product of claim 43, wherein the program code for executing the middleware layer to perform application and service discovery further comprises:

program code for launching a local application based on a reference in the combined application directory; and
program code for connecting the local application to a counterpart application executing on said at least one nearby device.

45. Apparatus, comprising:

means for conducting an inquiry to discover nearby devices,
means for determining, whether a discovered nearby device provides an indication that it may include a middleware software, the middleware software configured for providing application and service discovery;
when the discovered nearby device does not provide an indication that it may include the middleware software:
  disconnect communication session establishment with the discovered nearby device;
when the discovered nearby device provides an indication that it may include the middleware software layer
means for creating a wireless short-range communication connection to discovered nearby device;
means for confirming that said nearby device includes the middleware software by requesting corresponding information from said-nearby device via the wireless short-range communication connection; and
means for executing the middleware software to perform application and service discovery with said nearby device.

46. The Apparatus of claim 45, wherein the middleware layer includes a service discovery protocol and at least one computer program, each computer program comprising at least one sequence of operational instructions.

47. The Apparatus of claim 45, further comprising:

means for executing the middleware layer to launch applications and services when said at least one nearby device includes the middleware layer.

48. The Apparatus of claim 45, wherein the means for conducting the inquiry further comprises:

means for sending an inquiry request message; and
means for receiving an inquiry response message from said at least one nearby device, the inquiry response message including the indication.

49. The Apparatus of claim 45, wherein the means for creating the wireless short-range connection further comprises:

means for sending a paging request message directed to said at least one nearby device; and
means for receiving a paging accept message from said at least one nearby device.

50. The Apparatus of claim 45, wherein the means for confirming that said at least one nearby device includes the middleware layer further comprises:

means for sending a recognition request message to said at least one nearby device; and
means for receiving a recognition response message from said at least one nearby device.

51. The Apparatus of claim 45, wherein the means for executing the middleware layer to perform application and service discovery further comprises:

means for receiving a notification message from said at least one nearby device, the notification message including a local application directory stored in said at least one nearby device;
means for storing an update to a combined application directory, the update based on a comparison of the local application directory and the combined application directory; and
means for sending an update message to said at least one nearby device, the update message including an update portion of the combined application directory for updating the local application directory stored in said at least one nearby device.

52. The Apparatus of claim 51, wherein the means for executing the middleware layer to perform application and service discovery further comprises:

means for launching a local application based on a reference in the combined application directory; and
means for connecting the local application to a counterpart application executing on said at least one nearby device.

53. A wireless device, comprising:

a wireless short range transceiver;
a memory device; and
a processor disposed in communication with the memory device, the processor configured to:
conduct with the transceiver an inquiry to discover nearby devices,
  determine whether a discovered nearby device provides an indication that it may include a middleware software, the middleware software configured for providing application and service discovery;

when the discovered nearby device does not provide an indication that it may include the middleware software:
   disconnect communication session establishment with the discovered nearby device;
when the discovered nearby device provides an indication that it may include a middleware software;
   create with the transceiver a wireless short-range communication connection to the discovered nearby device;
confirm whether said nearby device includes the middleware software by requesting corresponding information from said nearby device via the wireless short-range communication connection; and
when said nearby device includes the middleware software:
execute the middleware software to perform application and service discovery with said nearby device.

* * * * *